United States Patent [19]
Garde

[11] Patent Number: 5,922,076
[45] Date of Patent: Jul. 13, 1999

[54] CLOCKING SCHEME FOR DIGITAL SIGNAL PROCESSOR SYSTEM

[75] Inventor: Douglas Garde, Dover, Mass.

[73] Assignee: Analog Devices, Inc., Norwood, Mass.

[21] Appl. No.: 08/931,665

[22] Filed: Sep. 16, 1997

[51] Int. Cl.$^6$ .................................................. G06F 1/04
[52] U.S. Cl. ............................................................. 713/600
[58] Field of Search .................................. 395/553, 555, 395/556, 559; 713/500, 501, 600; 709/400, 248

[56] References Cited

U.S. PATENT DOCUMENTS

| | | | |
|---|---|---|---|
| 5,611,075 | 3/1997 | Garde ........................................ | 395/480 |
| 5,619,720 | 4/1997 | Garde et al. ............................. | 395/800 |
| 5,685,005 | 11/1997 | Garde et al. ............................. | 395/800 |

*Primary Examiner*—Thomas M. Heckler
*Attorney, Agent, or Firm*—Wolf, Greenfield & Sacks, P.C.

[57] ABSTRACT

A digital signal processing system includes a cluster of processors and a host. A host can access each of the processors through an external bus system that interconnects the host with each of the processors. An external port of each of the processors operates at one of a local clock frequency and host clock frequency, the local clock frequency and host clock frequency being asynchronous with one another. The host operates at the host clock frequency. Upon a host access of one of the processors, the clock frequency of operation of the external parallel port of each processor automatically is controlled to operate at the host clock frequency. In an embodiment, each processor also includes a core processor that operates at a core clock frequency that is a multiple of the local clock frequency, asynchronous with the host clock frequency. Thus, the speed of operation of the core processor and that of the external parallel port can be optimized independently.

12 Claims, 6 Drawing Sheets

CLOCKING SCHEME FOR DIGITAL SIGNAL PROCESSOR SYSTEM

FIELD OF THE INVENTION

The present invention relates to digital signal processors, and more specifically, to a digital signal processor system and method having a unique asynchronous clocking scheme.

BACKGROUND OF THE INVENTION

A digital signal processor (DSP) is a special purpose computer that is designed to optimize performance for digital signal processing applications such as, for examples, fast Fourier transforms, digital filtering, image processing and speech recognition. Digital signal processing applications typically are characterized by real time operation, high interrupt rates and intensive numeric computations. In addition, digital signal processing applications tend to be intensive in memory access operations and to require the input and output of large quantities of data. Thus, designs of digital signal processors may be quite different from those of general purpose computers.

A typical digital signal processor includes at least one memory for storing digital signal processing operations instructions as well as operands used in the digital signal processing operations, and a core processor, connected to the memory, for carrying out such operations. A digital signal processor also typically includes a peripheral input/output (I/O) device enabling communication with, and the transfer of data to/from, other processors and/or external devices. The core processor includes some type of computation unit for performing the digital signal processing operations (i.e., computations) on the operands based on the instructions. Many different computational schemes as well as data storage and transferring schemes have been developed for optimizing speed, accuracy, size and performance of digital signal processors.

A digital signal processor commonly operates based upon receipt of a single input clock. From this single input clock are derived a core processor clock, on which the core processor operates, and an I/O clock, on which the I/O device operates. It is not uncommon for the input clock and the I/O clock to be maintained at the same frequency.

The core processor clock may be a multiple of this input clock such that the core processor operates at a different (typically greater) clock frequency than that of the I/O device. The speed of the I/O device is limited by the speed of the external signals upon which they operate. The speed of such external signals may be limited by physical constraints and capacitances and inductances of external devices and buses. The core processor is not so limited. Therefore, it is preferable to have the core processor operate at a different, and more optimal clock frequency.

Some digital signal processors allow the user to select a ratio (e.g., X2, X2.5, X3, X3.5, X4 . . .) by which the input clock will be multiplied to produce the core processor clock. This enables the user to select, within a limited range, a core processor frequency that is best for the particular processor.

As the geometries of processors shrink, internal speed paths improve, enabling faster operation. For a particular processor, therefore, there is an optimal speed at which the processor can operate. A limitation in currently available processors is that the core processor frequency is limited by the input clock and the user-selectable core clock ratios available.

In a digital signal processing system, a cluster (i.e., four, six or eight) of processors may be interconnected by an external bus system. A host computer, connected to each of the processors in the system through the bus system, may access any of the processors. The host computer operates at a host clock frequency that may be unrelated (asynchronously related) to the input clock frequency (I/O clock frequency) of each of the processors in the cluster.

When the host wishes to access any of the processors, either the host clock and the processor I/O clock must be synchronized, or asynchronous access must be enabled. Synchronization would require some type of external synchronizing interface between the host and each processor in the cluster. Alternatively, the provision of asynchronous access would require an additional, asynchronous processor I/O interface. To date, each of the approaches aimed at enabling an asynchronously operating host to access a processor requires complex and expensive circuitry. In addition, each of such approaches may be difficult for a user to implement and use.

It is a general object of the present invention to provide an improved processor clocking scheme.

SUMMARY OF THE INVENTION

One embodiment of the invention is directed to a digital signal processor. The digital signal processor receives a local clock and a system clock, wherein the local clock frequency and the system clock frequency may be asynchronous with one another. A core processor operates at a core clock frequency is a multiple of the local clock frequency. An external parallel port, coupled to the core processor, is operable at the system clock frequency or at the local clock frequency.

In an embodiment of the invention, the digital signal processor further includes a resynchronization circuit, coupled between the external parallel port and the core processor, that receives an input command signal and latches in the command signal when valid.

Another embodiment of the invention is directed to a digital signal processing system. The system includes a plurality of processors, each connected to another by an external bus system through an external port. A host, connected to each of the plurality of processors through the external bus system, operates at a host clock frequency. The host can access each processor through the external bus system. The external port of each of the processors operates either at a local clock frequency or at the host clock frequency, or at a multiple of either the local clock frequency or host clock frequency. Upon a host access, the clock frequency of the external port of each processor automatically is controlled to operate at the host clock frequency.

In one embodiment, the system further includes an external memory unit, connected to the host and to at least one of the processors through the external bus system. The memory also operates either at the local clock frequency or at the host clock frequency. Upon a host access of either one of the processors or of the memory unit, the clock frequency of the memory unit also automatically is controlled to operate at the host clock frequency.

In an embodiment, the clock frequency of operation of the external port of each processor is user-controlled.

In an embodiment, each processor includes a switch that receives a local clock and a host clock and selects one for operation of the external parallel port. In one embodiment, the switch includes a multiplexer.

In an embodiment, the clock frequency of the memory unit is controlled by a master processor to which it is connected.

In an embodiment of the system, each processor of the system includes a core processor that operates at a multiple of the local clock frequency, wherein the local clock frequency may be asynchronous with the host clock frequency. In this embodiment, each processor further includes a resynchronization circuit, coupled between the core processor and the external port, that latches in a received command signal when valid.

A further embodiment of the invention is directed to a method of digital signal processing. The method includes: connecting a host to a plurality of digital signal processors through a bus system; operating an external port of each processor at a local clock frequency, a host clock frequency, or a multiple of either the local clock frequency or host clock frequency; and automatically switching operation of the external port of each processor to the host clock frequency upon an access by the host of one of the processors.

In an embodiment, the method further includes the step of operating a core processor of each digital signal processor at a multiple of the local clock frequency, which may be asynchronous with the system clock frequency.

The features and advantages of the present invention will be more readily understood and apparent from the following detailed description of the invention, which should be read in conjunction with the accompanying drawings and from the claims which are appended to the end of the detailed description.

BRIEF DESCRIPTION OF THE DRAWING

For a better understanding of the present invention, reference is made to the accompanying drawings, which are incorporated herein by reference.

DETAILED DESCRIPTION

One embodiment of the present invention is directed to a cluster of digital signal processors interconnected by a bus system, and a host that can access any of the processors through the bus system. A periphery of each of the processors, connected to the bus system, operates at one of a local clock frequency and a host clock frequency. The host operates at the host clock frequency and, when the host accesses one of the processors, the clock frequency of operation of the periphery of each of the processors automatically is switched to the host clock frequency.

Another embodiment of the present invention is directed to a digital signal processor having a core processor that may operate asynchronously with the periphery of the processor. In particular, the periphery of the processor, such as an external parallel port, may operate at either a local clock frequency or a host clock frequency, wherein a user may select between the two. A core processor of the digital processor operates at a multiple of the local clock frequency. The local clock frequency and the host clock frequency may be independently generated and may be asynchronous with one another.

Figure 1:
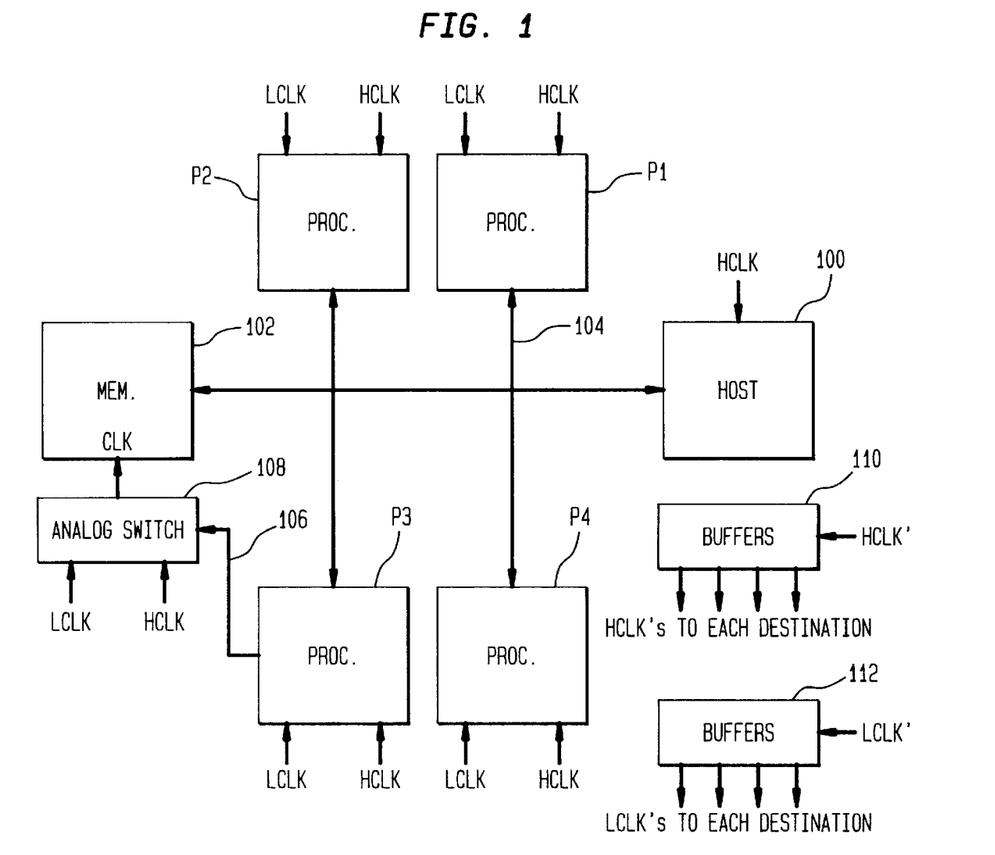
FIG. 1 is a block diagram of a system including a cluster of processors according to one embodiment of the invention.

FIG. 1 is a block diagram showing an exemplary embodiment of the present invention including a cluster of digital signal processors P1–P4. The system shown also includes a host 100 and a memory 102. The host 100, memory 102, and processors P1–P4 are interconnected by a bus system 104. The host may include an external computer that communicates with each of processors P1–P4 and external memory 102. External memory 102 may be any suitable external memory that operates with such a digital signal processing system such as Synchronous Dynamic Random Access Memory (SDRAM). Data may be written to or read from each of the processors, as well as to/from the memory.

Preferably, the external bus operates as a pipelined bus. In other words, the data may arrive one, two or three cycles after an address is issued, corresponding to a pipeline delay of one, two or three cycles respectively. Addresses may be issued on every cycle. Preferably, all signals are sampled on the clock signal rising edge and must meet a set-up time and a hold-time requirement.

During operation, host 100 may access any one of processors P1–P4 or memory 102 through bus 104. Host 100 operates on a host clock HCLK at a host clock frequency. Each processor P1–P4 receives the host clock HCLK and a local clock LCLK. In one embodiment, as explained in greater detail below, the host clock HCLK and local clock LCLK are independently generated and may be asynchronous with one another.

A periphery of each processor, that portion of the processor, such as an external parallel port, which couples the internal components of the processor to the external bus system 104, may operate at either the local clock LCLK frequency or the host clock HCLK frequency. In one embodiment, as explained below, this operation is user-selectable. Similarly, the memory may operate at either the local clock LCLK frequency or the host clock HCLK frequency.

In this embodiment, a buffer 110, having multiple series-terminated outputs, provides the host clock HCLK signal to each destination, which, in this embodiment, includes host 100, each processor P1–P4, and memory 102. Similarly, buffer 112, also having multiple series-terminated outputs, provides local clock LCLK signal to each destination, which, in this embodiment, includes each processor P1–P4 and memory 102. Each clock signal is provided on a separate trace, output from the buffer. The buffers ensure that the same clock signal timing is provided to each designation.

During operation, a periphery of each processor P1–P4 and memory 102 may be operating at the local clock LCLK frequency. When host 100 is to access one of processors P1–P4 or memory 102, the clock frequency of operation of the periphery of each processor P1–P4 automatically is switched from that of the local clock LCLK to that of the host clock HCLK. At the same time, the clock frequency of operation of the memory also is switched automatically from that of the local clock LCLK to that of the host clock HCLK.

In one embodiment, the switching occurs when a Host Bus Request (HBR) or Host Bus Grant (HBG) control signal is asserted by the host. Such control signal may be provided to each processor causing an internal switch (not shown) in each processor to switch the clock frequency from the local clock LCLK to the host clock HCLK. The switch internal to each processor may include a multiplexer, or the like. Glitch suppression is required for any clock signal switch to the processor. For example, glitch suppression can be attained by waiting for one clock to go low, and holding the clock output until the other clock goes low, and then driving the output with the first clock at that point.

In one embodiment, an external analog switch 108 selects one of host clock HCLK or local clock LCLK to clock the memory. A master processor P3 provides a control signal along line 106, at the appropriate time, causing analog switch 108 to select the host clock HCLK signal and provides such signal to memory 102. Switch 108 preferably is a low-resistance analog switch, such that the switching delay is maintained to be less than 0.2 nanoseconds. For example, the switch may be made from a low-resistance Field Effect Transistor. For external switch 108, the switching from the local clock LCLK to the host clock HCLK does not have to be glitch-free because no memory access is occurring during the switch over.

Figure 2:
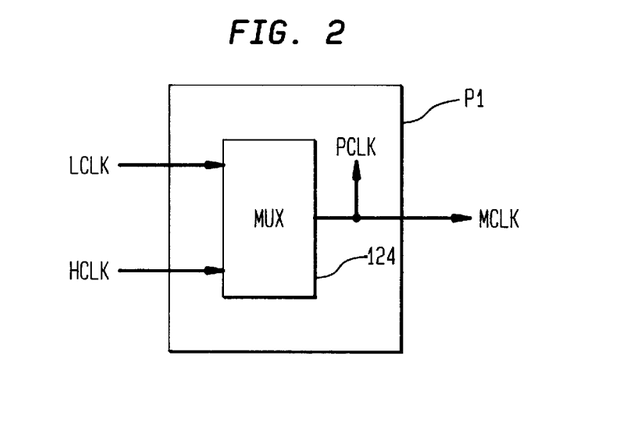
FIG. 2 is a block diagram of an alternate embodiment of the system shown in FIG. 1.

In an alternate embodiment of the system shown in FIG. 1, switch 108 of FIG. 1 is replaced by an internal multiplexer 124, shown in FIG. 2. Such a system includes four processors P1–P4, host 100, and memory 102 (see FIG. 1). Like the system of FIG. 1, the host operates at a host clock HCLK frequency and a periphery (I/O port) of each of the processors P1–P4 operates at a periphery clock PCLK frequency which may be equal to either the host clock HCLK frequency or at the local clock LCLK frequency. Memory 102 operates at a memory clock MCLK frequency which also may be equal to either the host clock HCLK frequency or at the local clock LCLK frequency. As in the embodiment of FIG. 1, upon a host access (of memory or a processor), periphery clock PCLK and memory clock MCLK automatically are switched to host clock HCLK. The switching may be performed internally of each processor by multiplexer 124. Multiplexer 124 is controlled to switch automatically to the host clock HCLK upon a host bus access or grant. The output of multiplexer 124 includes periphery clock PCLK signal and memory clock MCLK signal. One master processor P1–P4 may be selected to provide memory clock MCLK signal along bus 116 to memory 102.

Figure 3:
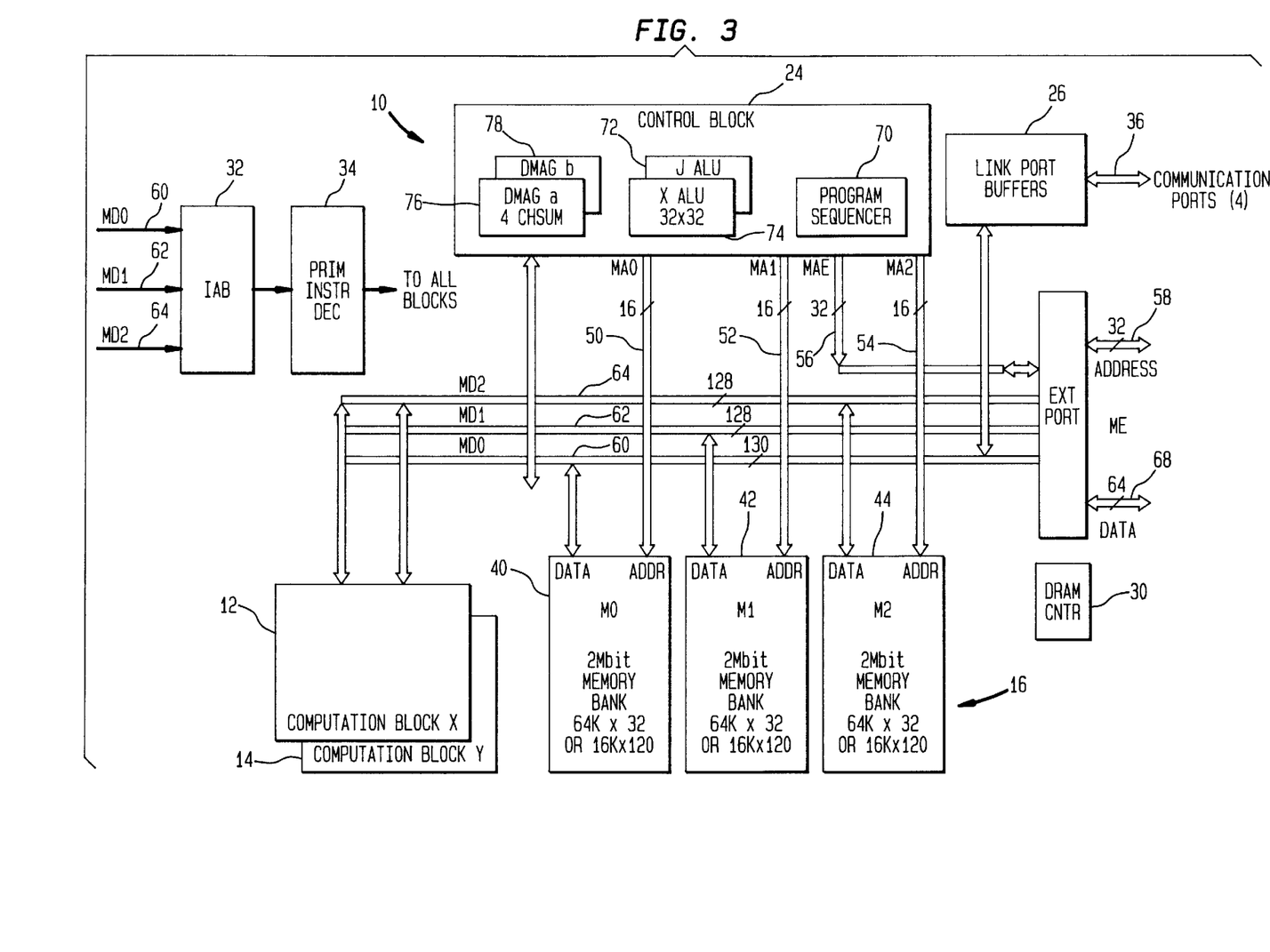
FIG. 3 is a block diagram of the internal components of an exemplary processor that may be used with the present invention.

Each processor shown in the systems of FIGS. 1 and 2 may be implemented having the components shown in FIG. 3. As shown, the principle components of DSP 10 are computation blocks 12 and 14, a memory 16, a control block 24, link port buffers 26, an external port 28, a DRAM controller 30, an instruction alignment buffer (IAB) 32 and a primary instruction decoder 34. Computation blocks 12 and 14, instruction alignment buffer 32, primary instruction decoder 34 and control block 24 constitute a core processor which performs the main computation and data processing functions of DSP 10. External port 28 controls external communications via an external address bus 58 and an external data bus 68. External port 28 may constitute the periphery of DSP 10. Link port buffers 26 control external communication via communication ports 36. DSP 10 is preferably configured as a single monolithic integrated circuit.

Memory 16 includes three independent, large capacity memory banks 40, 42 and 44. In an embodiment, each of memory banks 40, 42 and 44 has a capacity of 64K words of 32 bits each. Each of the memory banks 40, 42 and 44 may have a 128-bit data bus. Up to four consecutive aligned data words of 32 bits each can be transferred to or from each memory bank in a single clock cycle.

The elements of DSP 10 are interconnected by buses for efficient, high speed operation. Each of the buses includes multiple lines for parallel transfer of binary information. A first address bus 50 (MA0) interconnects memory bank 40 (M0) and control block 24. A second address bus 52 (MA1) interconnects memory bank 42 (M1) and control block 24. A third address bus 54 (MA2) interconnects memory bank 44 (M2) and control block 24. Each of the address buses 50, 52 and 54 may be 16-bits wide. An external address bus 56 (MAE) interconnects external port 28 and control block 24. External address bus 56 is connected through external port 28 to external address bus 58. Each of the external address buses 56 and 58 may be 32 bits wide. A first data bus 60 (MD0) interconnects memory bank 40, computation blocks 12 and 14, control block 24, link port buffers 26, IAB 32 and external port 28. A second data bus 62 (MD1) interconnects memory bank 42, computation blocks 12 and 14, control block 24, link port buffers 26, IAB 32 and external port 28. A third data bus 64 (MD2) interconnects memory bank 44, computation blocks 12 and 14, control block 24, link port buffers 26, IAB 32 and external port 28. The data buses 60, 62 and 64 are connected through external port 28 to external data bus 68. Each of the data buses 60, 62 and 64 may be 128 bits wide, and external data bus 68 may be 64 bits wide.

The first address bus 50 and the first data bus 60 comprise a bus for transfer of data to and from memory bank 40. The second address bus 52 and the second data bus 62 comprise a second bus for transfer of data to and from memory bank 42. The third address bus 54 and the third data bus 64 comprise a third bus for transfer of data to and from memory bank 44. Since each of memory banks 40, 42 and 44 has a separate bus, memory banks 40, 42 and 44 may be accessed simultaneously. As used herein, "data" refers to binary words, which may represent either instructions or operands that are associated with the operation of DSP 10. In a typical operating mode, program instructions are stored in one of the memory banks, and operands are stored in the other two memory banks. Thus, at least one instruction and two operands can be provided to computation blocks 12 and 14 in a single clock cycle. As described below, each of memory banks 40, 42, and 44 is configured to permit reading and writing of multiple data words in a single clock cycle. The simultaneous transfer of multiple data words from each memory bank in a single clock cycle is accomplished without requiring an instruction cache or a data cache.

The control block 24 includes a program sequencer 70, a first integer ALU 72 (J ALU), a second integer ALU 74 (K ALU), a first DMA address generator 76 (DMAG A) and a second DMA address generator 78 (DMAG B). Integer ALU's 72 and 74, at different times, execute integer ALU instructions and perform data address generation. During execution of a program, program sequencer 70 supplies a sequence of instruction addresses on one of address buses 50, 52, 54 and 56, depending on the memory location of the instruction sequence. Typically, one of memory banks 40, 42 or 44 is used for storage of the instruction sequence. Each of integer ALU's 72 and 74 supplies a data address on one of address buses 50, 52, 54 and 56, depending on the location of the operand required by the instruction. Assume, for example, that an instruction sequence is stored in memory bank 40 and that the required operands are stored in memory banks 42 and 44. In this case, the program sequencer supplies instruction addresses on address bus 50 and the accessed instructions are supplied to the instruction alignment buffer 32, as described below. Integer ALU's 72 and 74 may, for example, output addresses of operands on address buses 52 and 54, respectively. In response to the addresses generated by integer ALU's 72 and 74, memory banks 42 and 44 supply operands on data buses 62 and 64, respectively, to either or both of computation blocks 12 and 14. Memory banks 40, 42 and 44 are interchangeable with respect to storage of instructions and operands.

Program sequencer 70 and the integer ALU's 72 and 74 may access an external memory (not shown) via external port 28. The desired external memory address is placed on address bus 56. The external address is coupled through external port 28 to external address bus 58. The external memory supplies the requested data word or data words on external data bus 68. The external data is supplied via external port 28 and one of the data buses 60, 62 and 64 to one or both of computation blocks 12 and 14. The DRAM controller 30 controls the external memory.

As indicated above, each of the memory banks 40, 42 and 44 may have a capacity of 64k words of 32 bits each. Each memory bank may be connected to a data bus that is 128 bits wide. In an alternative embodiment, each data bus may be 64 bits wide, and 64 bits are transferred on each of clock phase 1 and clock phase 2, thus providing an effective bus width of 128 bits. Multiple data words can be accessed in each memory bank in a single clock cycle. Specifically, data can be accessed as single, dual or quad words of 32 bits each. Dual and quad accesses require the data to be aligned in memory. Typical applications for quad data accesses are the fast Fourier transform (FFT) and complex FIR filters. Quad accesses also assist double precision operations. Preferably, instructions are accessed as quad words. However, as discussed below, instructions are not required to be aligned in memory.

Using quad word transfers, four instructions and eight operands, each of 32 bits, can be supplied to computation blocks 12 and 14 in a single clock cycle. The number of data words transferred and the computation block or blocks to which the data words are transferred are selected by control bits in the instruction. The single, dual, or quad data words can be transferred to computation block 12, to computation block 14, or to both. Dual and quad data word accesses improve the performance of DSP 10 in many applications by allowing several operands to be transferred to the computation blocks 12 and 14 in a single clock cycle. The ability to access multiple instructions in each clock cycle allows multiple operations to be executed in each cycle, thereby improving performance. If operands can be supplied faster than they are needed by the computation blocks 12 and 14, then there are memory cycles left over that can be used by DMA address generators 76 and 78 to provide new data to the memory banks 40, 42 and 44 during those unused cycles, without stealing cycles from the core processor. Finally, the ability to access multiple data words makes it possible to utilize two or more computation blocks and to keep them supplied with operands. The ability to access single or dual data words reduces power consumption in comparison with a configuration where only quad data words are accessed.

In processor 10 shown in FIG. 3, external port 28 may comprise a periphery of the processor and would operate at a periphery clock PCLK. The remaining components of DSP 10, in one embodiment of the invention, would operate at a core clock CCLK, which is a multiple of local clock LCLK, as described below.

Figure 4:
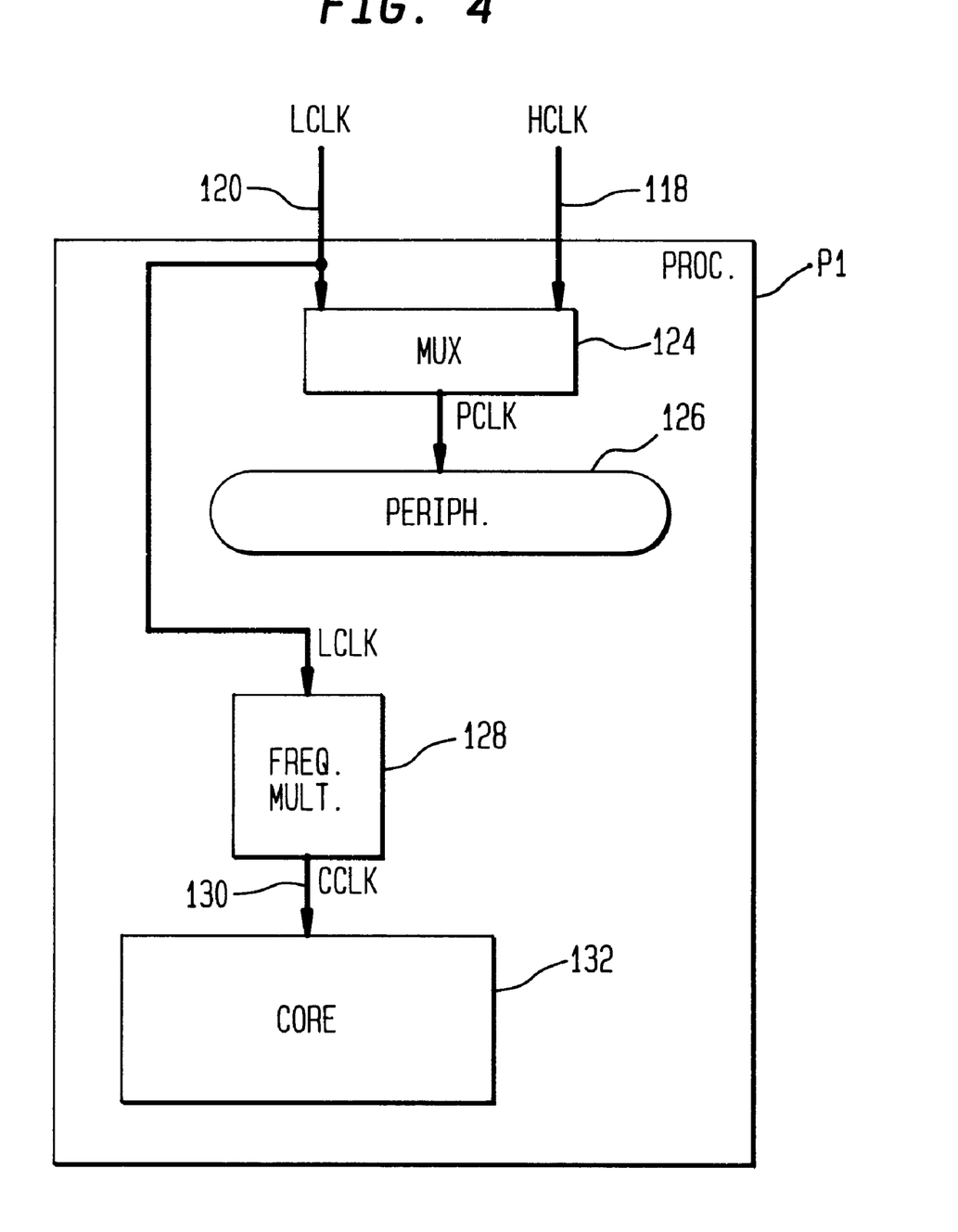
FIG. 4 is a part functional, part structural block diagram of certain processor components and the different clock signals on which the components operate.

FIG. 4 is a part structural, part functional block diagram of some components of processor P1 and the clock signals on which they operate. The processor P1 shown includes a core processor 132, operating at a core clock CCLK frequency, and a periphery 126, operating at either a local clock LCLK frequency or a host clock HCLK frequency, or a multiple of either LCLK or HCLK. Periphery 126 may consist of external port 28 that communicates with external data bus 68 and external address bus 58, shown in FIG. 3.

Processor 132 receives both the local clock LCLK signal and the host clock HCLK signal as inputs. Not shown in FIG. 4 is a delay calibration circuit through which each input clock signal is run to account for propagation delays, as described in greater detail hereinafter with reference to FIG. 5. Both are provided to switch 124 which selects one as the periphery clock PCLK to periphery 126, as described above with reference to FIGS. 1 and 2.

The local clock LCLK signal also is provided to a frequency multiplier 128. Frequency multiplier 128 multiplies the local clock LCLK signal by a ratio selected by the user and outputs the product, which is the core clock signal CCLK, on line 130 to core processor 132. Frequency multiplier may, for example, include the ratios, X2, X2.5, X3, X3.5, X4, one of which is selected by a user to produce the core clock CCLK.

This embodiment of the invention enables the frequency of operation of the core processor 132 to be optimized independently of the frequency of operation of the periphery 126. The frequency of operation of the periphery 126 may be limited by the external bus should such periphery consist of the external parallel port. Such a limitation would not, however, affect the speed of the core processor. The invention also enables the frequency of operation of the periphery to be optimized independently of the speed of operation of the core.

As stated, the host clock HCLK and local clock LCLK are generated independently and may be asynchronous with one another. For example, host clock HCLK may be 66 MHz and local clock LCLK may be 100 MHz. When periphery 126 operates on the local clock LCLK, it appears to operate synchronously with core processor 132. As described above, with reference to FIGS. 1 and 2, the switch to operating on host clock HCLK occurs automatically upon an access request by the host. Because the core clock CCLK is related to the local clock LCLK and because the local clock LCLK may be asynchronously related to the host clock HCLK, periphery 126 may appear to operate asynchronously with core processor 132 (when operating at the host clock HCLK frequency). To account for such operation, an asynchronous interface (not shown in FIG. 4) exists between periphery 126 and core processor 132, and will be described in greater detail below.

Given the high speeds at which the bus operates, skew in the periphery clock PCLK and the memory clock MCLK should be minimized. In addition, skew in the core clock CCLK should be removed in the frequency multiplexer. In one embodiment of the present invention, a delay calibration loop is employed to calibrate out the undesired skew. The input to the delay calibration circuit is the input clock signal, whether LCLK or HCLK. A multiplexer may select between the two. Preferably and alternatively, two delay calibration circuits may be employed, one for each input clock signal.

Figure 5:
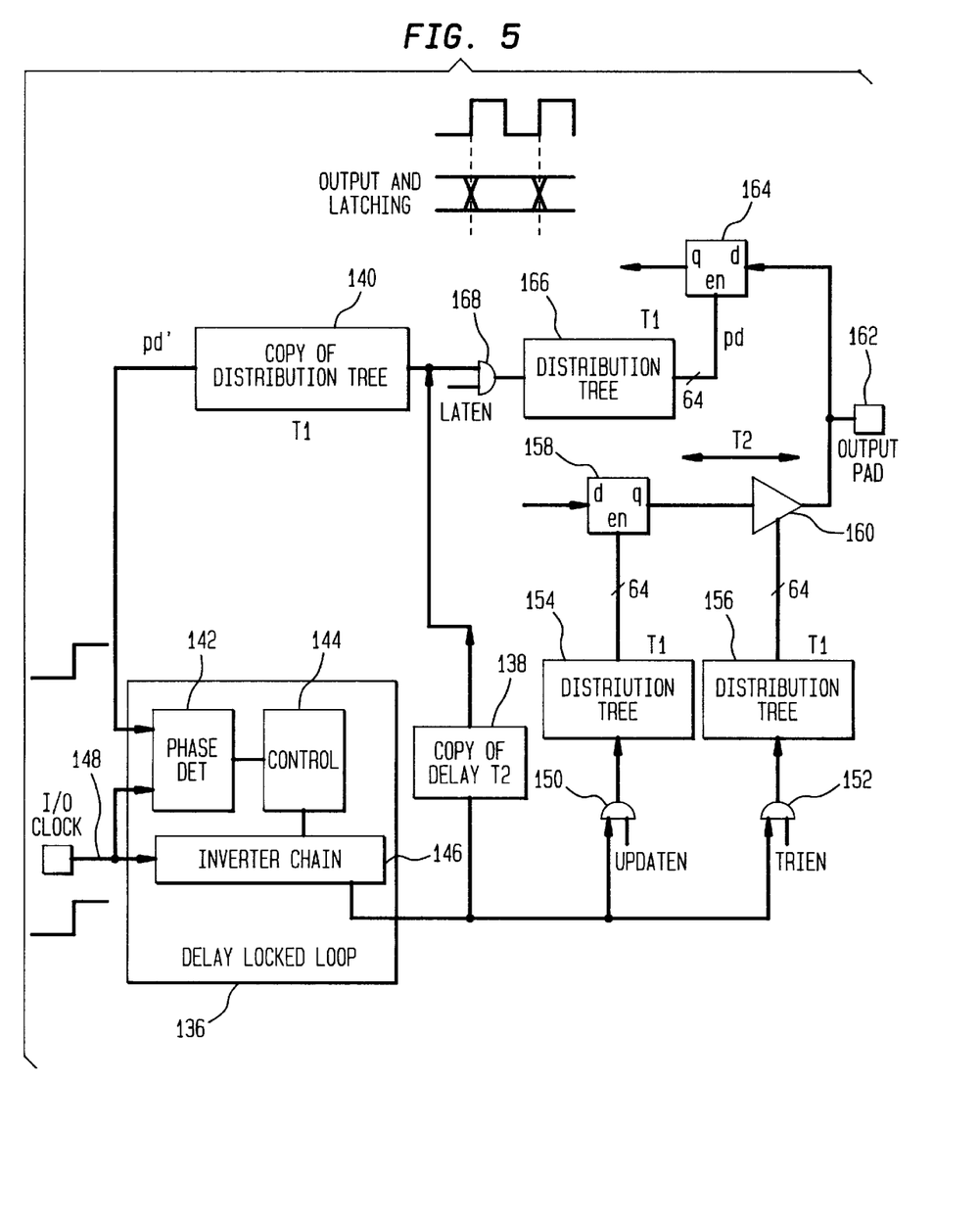
FIG. 5 is a block diagram of an exemplary delay calibration circuit that may be used with a processor of the invention.

An exemplary delay calibration circuit for use with the processor of the invention is shown in block diagram form in FIG. 5. Such delay calibration circuit may be used for LCLK or for HCLK. The delay calibration circuit ensures the latching of data into the processor (or out from the processor) precisely at a rising edge of the clock signal, accounting for propagation delays of the signal through processor elements such as a distribution tree. With the circuit, a latch control signal is asserted a delay time period before a rising edge of the appropriate clock signal. A delay-locked loop (DLL) provides another clock signal, similar to and in phase with the input clock signal, but delayed by one period minus internal input propagation delays of the clock signal. This other clock signal enables a latch to latch in data or latch data out at an appropriate time, precisely at the rising edge of the clock signal with accounted for propagation delays.

As shown, the delay calibration circuit includes a DLL 136, a delay element 138 and a delay element 140. Delay element 138 provides a delay of $T_2$ to the signal output by DLL 136, which delay $T_2$ corresponds to the output delay of an output driving pad consisting of latch 158 and driver 160. Delay 140, provides a delay of $T_1$ to the signal input, which delay $T_2$ corresponds to the propagation delay of the signal through the distribution tree, shown at 154, 156 and 166.

DLL 136 includes a phase detector 142, a control circuit 144, and an inverter chain 146. When data is latched into the processor, signal pd enables latch 164 to latch data in at a rising edge of signal pd. Signal pd' output by delay circuit 140 has a delay $T_1$ corresponding to that of distribution tree 166. DLL 136 ensures that the periphery clock PCLK input to the DLL on line 148 is synchronous with clock signal pd' such that latch 164 is latched synchronously with the rising edge of PCLK, minus propagation delays. Similarly, the signals provided to the output driving pad including those which enable latch 158 and driver 160, are synchronous with the rising edge of the input clock, accounting for appropriate delays. Thus, the actual latch control signals, whether input or output, actually are asserted one clock signal period later than an initial input clock period, minus appropriate delays accounted therefor, whether those of distribution tree and/or output pad.

Figure 6:
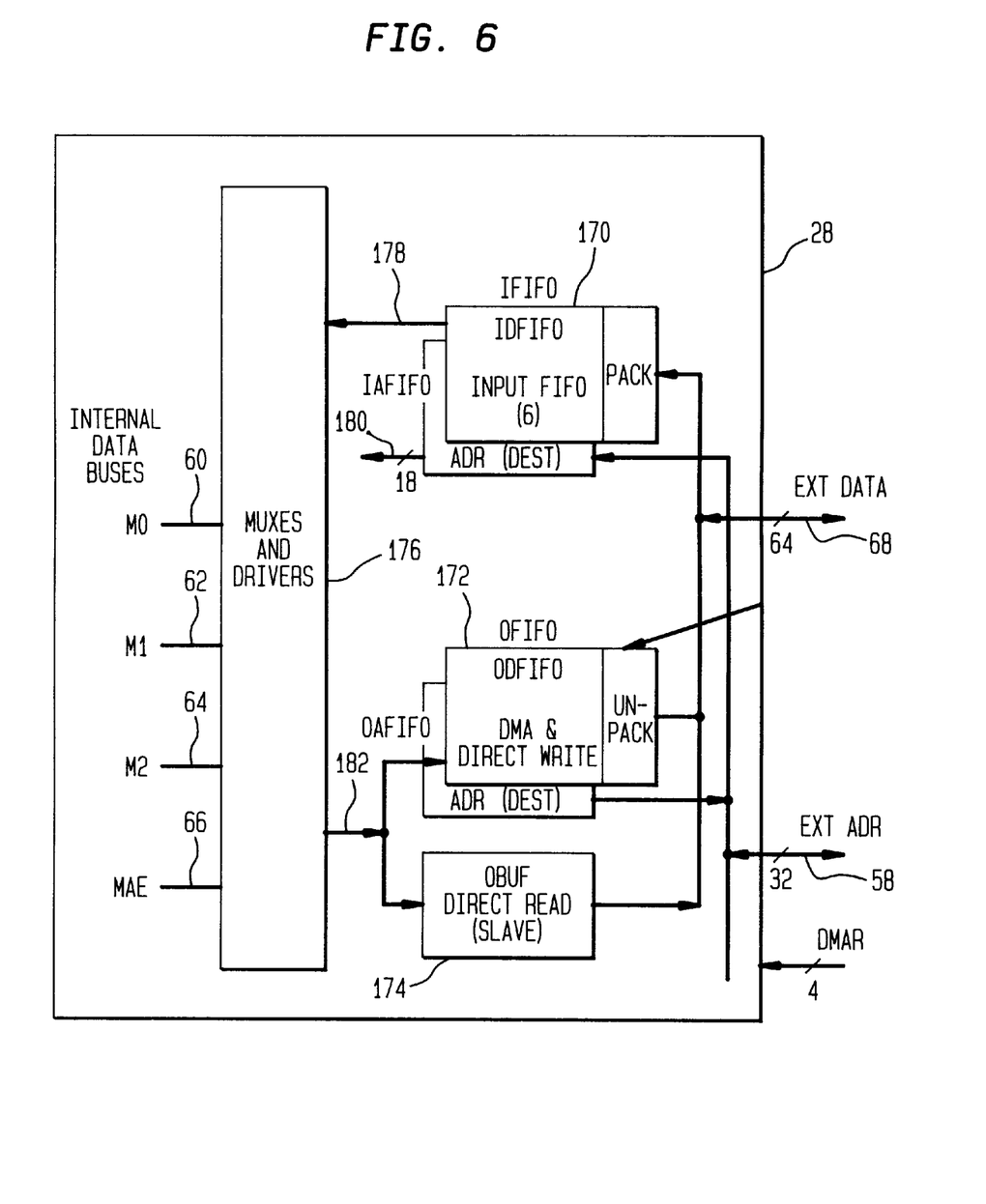
FIG. 6 is a block diagram of an exemplary external port block that may be employed within a processor of the invention.

FIG. 6 is a block diagram of an exemplary external port block 28 employed within each processor of the invention. As described, external port 28 operates at the periphery clock PCLK that may be equal to local clock LCLK or the host clock HCLK, one asynchronous with the other. The external port receives and transmits data on external data bus 68 (in this exemplary embodiment, 64 bits wide), and receives and transmits addresses on address bus 58 (in this exemplary embodiment, 32 bits wide).

A number of operations can be carried out by a (slave) processor based on commands received from a different (master) processor. The operations are communicated through the external port block. These operations include reading data from the slave processor and writing data to the master processor, wherein a number of different read and write operations are available. The particular read and write operations available do not in particular form part of the invention but help illustrate the advantages of using the clocking scheme of the invention.

As shown, the external port block includes an input first-in-first-out (FIFO) buffer 170, an output FIFO 172, and an output buffer 174. Input FIFO 170, output FIFO 172 and output buffer 174 communicate through a multiplexers and drivers block 176 to internal data buses 60, 62, 64 and 56, described above with reference to FIG. 3.

Because the external port block of the present invention may operate asynchronously with the core processor, a resynchronization circuit is used to ensure that the received command signal, whether read or write, is valid and latched in at an appropriate time. The command signal should be latched in upon a rising edge of the clock signal. When a command is received by the external port block, it is latched therein. Then it is provided through the resynchronization latch circuit 190 shown in FIG. 7.

Figure 7:
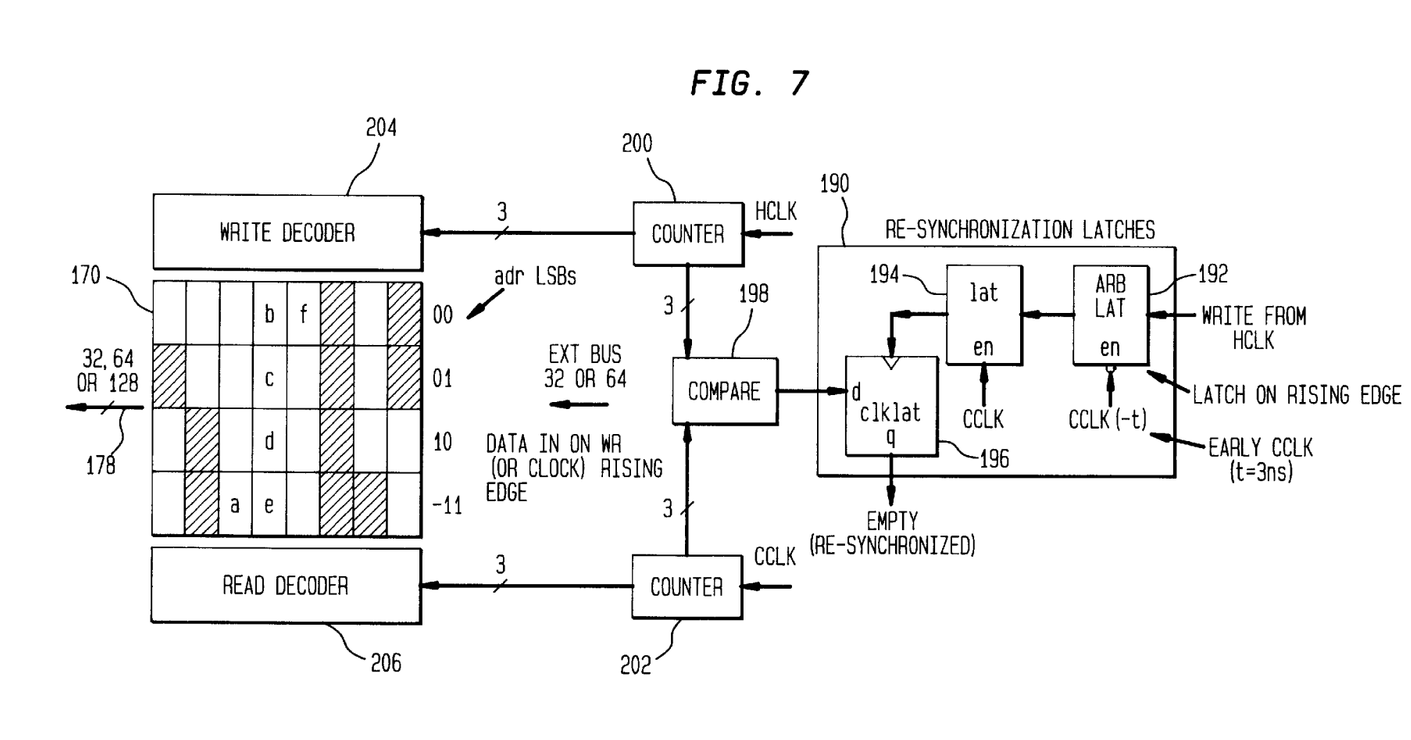
FIG. 7 is a part functional, part structural block diagram of a resynchronization circuit that may be employed within a processor of the invention.

As examples, a write operation and a read operation will be described below with reference to FIG. 7. During a write operation, a write command is provided from a master processor to a slave processor. The master processor puts the address of the data to be written and the actual data to be written in its output FIFO 172. The slave processor, to be written to, puts the address and data, received from the master process, in its input FIFO 170.

During a read operation, a read command is provided from a master processor to a slave processor. The master processor puts the address (from where the data is to be read) in its output FIFO 172. The slave processor puts the received address in its input FIFO 170. Once read, the data is put into the output buffer 174 of the slave processor, which bypasses the output FIFO 172.

Upon receipt of a command signal, such as a write command signal, resynchronization latch circuit 190 causes a delay before that command signal is considered to be valid, at which time writing of data to the input FIFO 170 is performed. First, the write command signal is latched by an arbitration latch 192 on the rising edge of the core clock CCLK signal. Then, the write commane signal is latched by latch 194 on the rising edge of core clock CCLK, a delay time period t later. In one embodiment, this time period t may be equal to 3 nanoseconds. It should be appreciated that the arbitration latch is very fast. A delay t then occurs before a command signal is latched by the second latch such that the command signal is deemed to be valid before the appropriate operation is performed. In this exemplary embodiment, the output of latch 194 clocks a D flip-flop 196 which, in turn, controls a comparator 198 to begin the operation, but the invention is not so limited.

Once the second latch latches in the command signal, the operation may be carried out. In this embodiment, the contents of a write counter 200 are compared with the contents of a read counter 202 by comparator 198. Write counter 200 is updated each time a location in the input FIFO 170 is written to. Similarly, read counter 202 is updated each time a location is read from. If the contents of write counter 200 are equal to the contents of read counter 202, then the write pointer is pointing to the same location as the read pointer, indicating that the location pointed to is empty. Data therefore can be written to that location. Other techniques than that shown and described are available for this purpose.

As shown, for the input FIFO, write counter 200 is controlled by host clock HCLK and read counter 202 is controlled by local clock LCLK. While the resynchronization latch has been shown coupled to the input FIFO, a similar circuit will be used for the output FIFO as well. For the output FIFO (not shown), the write counter is controlled by the core clock CCLK and the read counter is controlled by the host clock HCLK.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto

What is claimed is:

1. A digital signal processor comprising:
   an external parallel port, that is operable at a first clock frequency or at a second clock frequency; and
   a core processor, coupled to the external parallel port, that operates at a core clock frequency, that is a multiple of the second clock frequency;
   wherein the first clock frequency and the second clock frequency are asynchronous with one another.

2. The digital signal processor as claimed in claim 1 wherein a user may select between the first clock frequency and the second clock frequency for operation of the external parallel port.

3. The digital signal processor as claimed in claim 1 further including a resynchronization circuit, coupled between the external parallel port and the core processor, that receives a command signal and latches in the command signal a delayed time period following a core clock signal.

4. A digital signal processing system comprising:
   a plurality of processors, each processor connected to another by an external bus system through an external port, the external port of each processor operating at a local clock frequency, at a host clock frequency, or at a multiple of the local clock frequency or host clock frequency; and
   a host, connected to each of the plurality of processors through the external bus system, the host operating at the host clock frequency, wherein the host can access each processor through the external bus system; and
   upon a host access of one of the processors, the clock frequency of the external port of each processor automatically is controlled to operate at the host clock frequency.

5. The digital signal processing system as claimed in claim 4 wherein the clock frequency of operation of each external parallel port of each processor is user-controlled.

6. The digital signal processing system as claimed in claim 4 further including a switch within each processor that receives a local clock and a host clock and selects one for operation of the external parallel port.

7. The digital signal processing system as claimed in claim 4 further including an external memory, connected to the host and at least one of the processors through the external bus system, wherein the memory also operates either at the local clock frequency or at the host clock frequency, and whereupon a host access, the clock frequency of the memory also automatically is switched to operate at the host clock frequency.

8. The digital signal processing system as claimed in claim 7 wherein the clock frequency of the memory is controlled by a master processor to which it is connected.

9. The digital signal processing system as claimed in claim 4 wherein each processor includes a core processor that operates at a multiple of the local clock frequency, the local clock frequency being asynchronous with the host clock frequency.

10. The digital signal processing system as claimed in claim 9 wherein each processor further includes a resynchronization circuit, coupled between the core processor and the external parallel port, that receives a command signal and latches in the command signal a delayed time period following a core clock signal.

11. A method of digital signal processing comprising:
    connecting a host to a plurality of digital signal processors through a bus system;
    operating an external port of each processor at a local clock frequency, a host clock frequency or a multiple of the local clock frequency or host clock frequency; and
    automatically switching operation of the external port of each processor to the host clock frequency upon access by the host of one of the processors.

12. The method as claimed in claim 11 further comprising the step of operating a core processor of each digital signal processor at a multiple of the local clock frequency, the local clock frequency being asynchronous with the host clock frequency.

* * * * *